United States Patent [19]

Payner et al.

[11] Patent Number: 4,880,300
[45] Date of Patent: Nov. 14, 1989

[54] VISION SAVER FOR COMPUTER MONITOR

[76] Inventors: Leonard E. Payner, 707 Washington Ave.; Jimmy L. Keener, 701 Washington Ave., both of Elyria, Ohio 44035

[21] Appl. No.: 191,079

[22] Filed: May 6, 1988

[51] Int. Cl.$^4$ ............................................. G02B 27/02
[52] U.S. Cl. ............................... 350/618; 350/276 R; 350/623; 248/246; 248/918
[58] Field of Search .................... 350/618, 623, 276 R; 248/1 A, 1 B, 1 C, 246

[56] References Cited

U.S. PATENT DOCUMENTS

| | | |
|---|---|---|
| 2,234,227 | 3/1941 | Below et al. |
| 2,566,830 | 9/1951 | Goldsmith. |
| 3,820,885 | 6/1974 | Miller. |
| 4,383,740 | 5/1983 | Bordovsky. |
| 4,400,723 | 8/1983 | Fanizza et al. |
| 4,506,295 | 3/1985 | Young et al. |
| 4,568,080 | 2/1986 | Yokoi. |
| 4,569,572 | 2/1986 | Kupich ............................ 350/276 R |
| 4,589,659 | 5/1986 | Yokoi et al. |
| 4,605,291 | 8/1986 | Jolly ..................................... 350/618 |
| 4,717,248 | 1/1988 | Larussa ................................ 350/618 |

FOREIGN PATENT DOCUMENTS 1093402 11/1954 France.

Primary Examiner—Bruce Y. Arnold
Assistant Examiner—R. D. Shafer
Attorney, Agent, or Firm—Antonelli, Terry & Wands

[57] ABSTRACT

A vision saver for use with a computer monitor relieves eye strain, reduces focusing problems, minimizes eye convergence, reduces the number of eye and head movements by an operator using a computer keyboard with the computer monitor, and deflects any direct radiation coming out of the monitor. The vision saver comprise first and second reflecting surfaces and a supporting structure for supporting the reflecting surfaces in spaced relation in front of the computer monitor such that the first reflecting surface faces the screen of the monitor and the second reflecting surface, and the second reflecting surface faces the first reflecting surface and outwardly from the screen of the monitor whereby a person can visually observe the screen of the computer monitor by viewing the second reflecting surface which can advantageously be positioned closer to the computer keyboard than the screen of the monitor.

14 Claims, 4 Drawing Sheets

FIG. 3
FIG. 4
FIG. 5
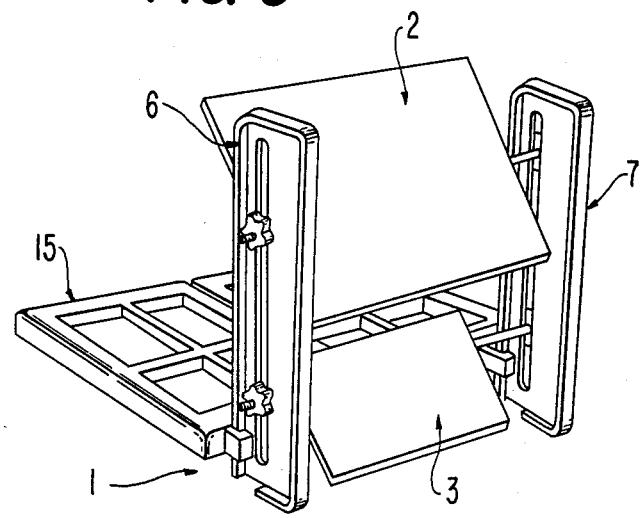
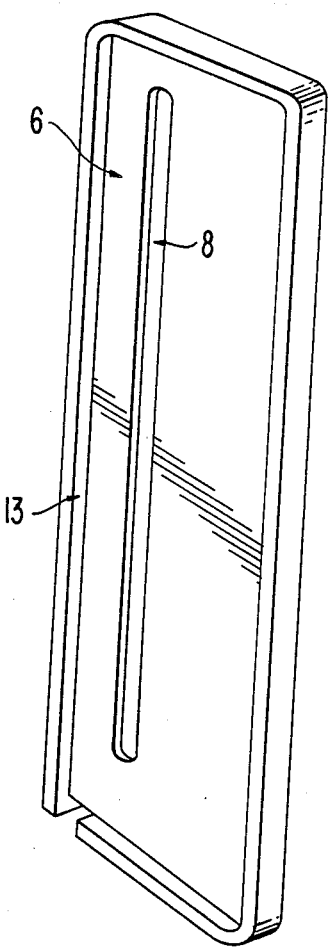
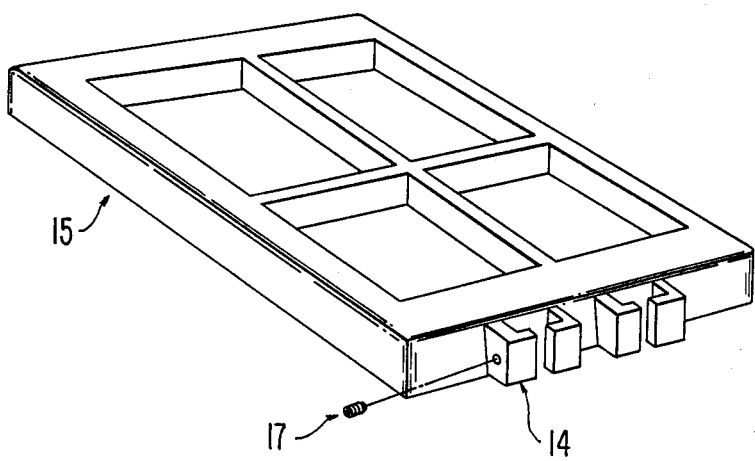

VISION SAVER FOR COMPUTER MONITOR

BACKGROUND AND SUMMARY OF THE INVENTION

The present invention is directed to a vision saver and method of using the same with a computer monitor for relieving eye strain.

There are frequent complaints from people who view computer monitors for prolonged periods. Because of the fact that the computer monitor is normally at approximately 18 to 20 inches from the person seated before a desk or a table supporting the computer monitor, eye strain, frequent eye and head movements, focusing problems, and other similar problems tend to occur. This is primarily related to the fact that the monitor is relatively close to the viewer, and the keyboard is at a lower level than the monitor.

An object of the present invention is to provide a vision saver which eliminates the aforementioned problems in viewing computer monitors. More particularly, an object of the present invention is to provide a vision saver which relieves eye strain by minimizing focusing problems, reducing the amount of eye convergence required and limiting the number of eye and head movements. A further object is to deflect any direct radiation coming out of the monitor in the direction of the viewer.

These and other objects are attained by the vision saver for a computer monitor according to the present invention. The vision saver comprises first and second reflecting surfaces and support means for supporting the first and second reflecting surfaces in spaced relation in front of the computer monitor such that the first reflecting surface faces the screen of the monitor and the second reflecting surface, and the second reflecting surface faces the first reflecting surface and outwardly from the screen of the monitor whereby a person can visually observe the screen of the computer monitor by viewing the second reflecting surface. Applicants have found that this vision saver causes the image on the screen of the computer monitor to appear to be farther away when viewed in the second reflecting surface as compared with direct viewing of the image on the monitor screen. At the same time, according to a further feature of the invention, the vision saver puts the image on the screen of a computer monitor in a more reasonable position for the viewer to view so that when the viewer is wearing bifocal glasses, for example, he/she may read the image with the distance lenses on the glasses and not necessarily the close up or reading lenses. According to a preferred embodiment of the invention, the first reflecting surface is supported in an elevated position with respect to the second reflecting surface and the second reflecting surface is supported in a position closer to a keyboard of a computer than the screen of the monitor thereby reducing or eliminating head movement when visually jumping back and forth between the image on the screen of the monitor and the keyboard.

The first and second reflecting surfaces are primary reflecting surfaces or mirrored surfaces according to the invention. The support means includes means for adjusting the positions of the reflecting surfaces with respect to the support means and also means for adjusting the facing directions of the reflecting surfaces.

In one form of the invention, the support means is free standing and includes a platform for supporting the computer monitor. Means are provided for adjusting the height of the platform with respect to the remainder of the support means and the first and second reflecting surfaces supported thereby so that the vision saver can be quickly adapted for use with different sizes of monitors. The remainder of the support means includes a pair of uprights spaced from one another and supporting the first and second reflecting surfaces therebetween at respective ends of the reflecting surfaces.

In a second form of the invention, the support means includes means for connecting the support means to a computer monitor. In this form of the invention, the support means is provided with means pivoting the support means and the reflecting surfaces supported thereby with respect to the computer monitor, so that the vision saver can be pivoted into a position for use by the viewer or pivoted out of such position when it is not desired to use the device.

According to another feature of the invention, the support means and an edge of the first reflecting surface supported thereby are located in substantially the same plane so that they can be positioned immediately adjacent the front of the monitor. This eliminates most overhead light and various distractions which might be noted while viewing the monitor. The first reflecting surface is also preferably positioned to visually block direct view of the monitor screen by the viewer to eliminate distraction when viewing the screen in the second reflecting surface. In such position the first reflecting surface deflects any direct radiation coming out of the monitor in the direction of the viewer.

The method of the invention of relieving eye strain while visually observing a computer monitor comprises the steps of supporting first and second reflecting surfaces in spaced relation in front of a computer monitor such that the first reflecting surface faces the screen of a monitor and the second reflecting surface, and the second reflecting surface faces the first reflecting surface and outwardly from the screen of the monitor, and viewing the second reflecting surface to observe the screen of the monitor. Preferably, the first reflecting surface is supported in an elevated position with respect to the second reflecting surface and the second reflecting surface is supported in a position closer to a keyboard of the computer than the screen of the monitor. Because the image on the screen of the monitor appears to be farther away when viewed in the second reflecting surface as compared with direct viewing of the screen of the monitor, and because the image is positioned for the viewer to read the screen image in the second reflecting surface, a person can use single vision lenses or the distance part of his bifocals, not necessarily the reading area. By viewing this image of the monitor, necessary eye convergence is reduced and focusing problems are minimized. This, taken with the reduction or elimination of head movement and eye movement, results in relief of eye strain which frequently occurs when viewing a computer monitor in a conventional manner.

These and other objects, features and advantages of the invention will become more apparent from the following description when taken in connection with the accompanying drawings which show, for purposes of illustration only, two embodiments in accordance with the present invention.

BRIEF DESCRIPTION OF THE DRAWINGS

FIG. 3 is a perspective view of the assembled vision saver of FIGS. 1 and 2 in the absence of a computer monitor and keyboard;

FIG. 4 is an enlarged view, partially cut away of one of the two uprights of the vision saver;

FIG. 5 is an enlarged view of a portion of the monitor platform and a mounting bracket to be attached thereto for receiving a flange of an upright member of the vision saver.

DETAILED DESCRIPTION OF THE DISCLOSED EMBODIMENTS

Figure 1:
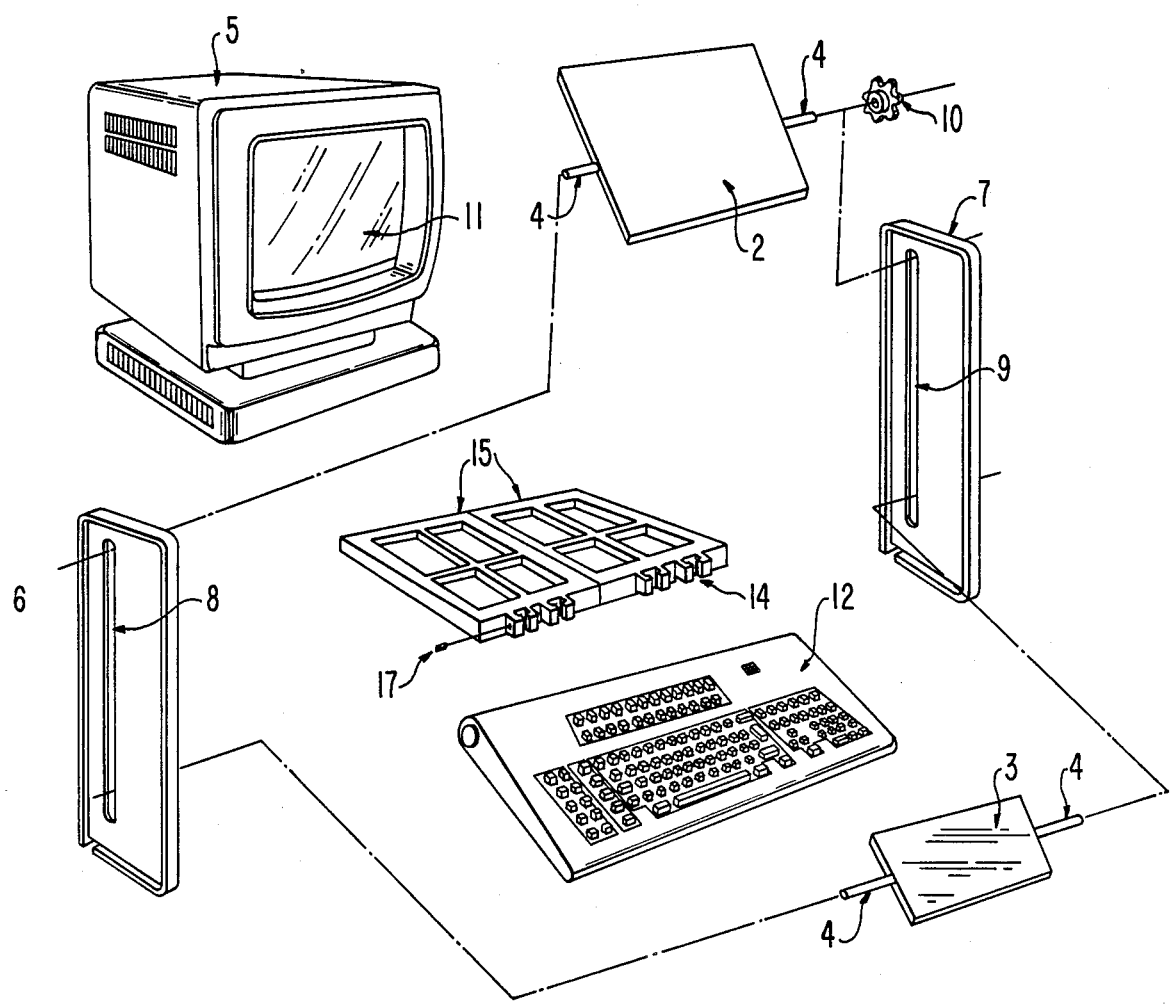
FIG. 1 is a perspective view of a disassembled vision saver of the present invention in proximity to a computer with a computer monitor and keyboard.

Referring now to the drawings, a vision saver 1 according to a first embodiment of the invention is shown in FIGS. 1-5. The vision saver 1 comprises first and second reflecting surfaces 2 and 3, respectively. The reflecting surfaces 2 and 3 are primary reflecting surfaces, particularly they are front surfaced mirrors in the illustrated embodiment.. The reflecting surfaces 2 and 3 are each formed with threaded studs 4 on two opposite sides for support.

The reflecting surfaces 2 and 3 are supported in a position of use in front of a computer monitor 5 by means of a pair of upright members 6 and 7. In particular, the studs 4 of the reflecting surfaces 2 and 3 extend through elongated channels 8 and 9 of the upright members. Threaded knobs 10 received by the threaded studs 4 releasably clamp the reflecting surfaces to the upright members 6 and 7 in the desired positions.

Figure 2:
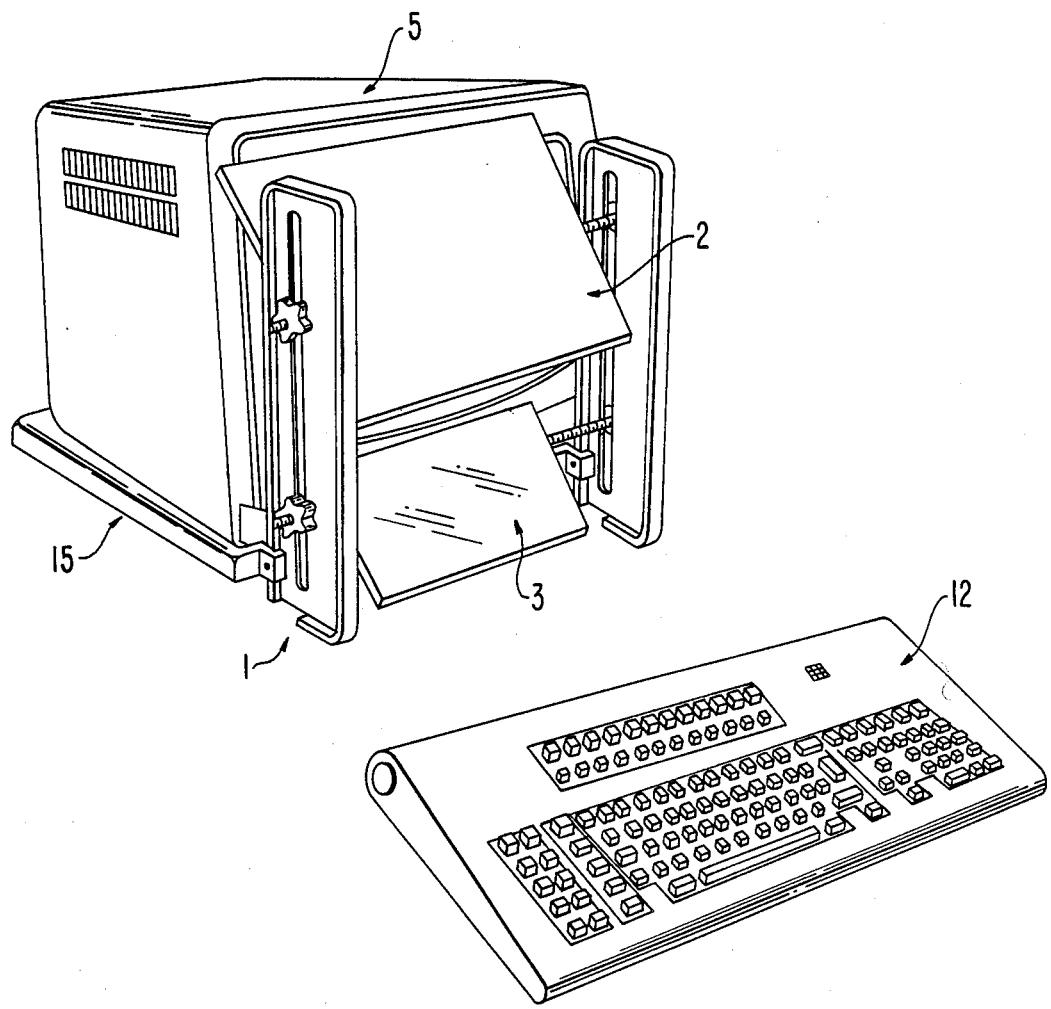
FIG. 2 is a view similar to FIG. 1 but with the vision saver in assembled position in front of the computer monitor for use by a computer operator.

As shown in FIG. 2, the first and second reflecting surfaces are supported in the upright members 6 and 7 in spaced relation in front of the computer monitor 5 such that the first reflecting surface 2 faces the screen 11 of the computer monitor and the second reflecting surface 3, while the second reflecting surface faces the first reflecting surface and outwardly from the screen 11 of the monitor. This permits a person sitting in front of the keyboard 12 of the computer to visually observe the image, letters or other characters, on the screen 11 of the computer monitor 5 by viewing the second reflecting surface 3. The upright members 6 and 7 and also the inner edge of the first reflecting surface 2 are positioned in substantially the same plane closely adjacent the front of the monitor blocking any direct view of the monitor that would interfere with the second reflecting surface when viewed.

The arrangement of the first and second reflecting surfaces 2 and 3 in front of the computer monitor causes the screen image seen in the second reflecting surface 3 to appear to be farther away than if viewed directly without the vision saver of the invention. The vision saver puts the image in a more reasonable position for the viewer to view so that the viewer, if wearing bifocal glasses, can read the image with the distance lenses on his/her glasses and not necessarily the close up or reading lenses. Whether or not the viewer wears glasses, it has been found that the invention relieves eye strain and minimizes focusing problems for people of all ages because the image appears to be farther away when viewing the screen image at the second reflecting surface 3. The number and magnitude of eye and head movements required by the computer operator is also reduced as is eye convergence, with the vision saver of the invention. The first reflecting surface also acts to deflect any direct radiation coming out of the computer monitor away from the viewer.

The width of the first reflecting surface 2 is wider than the second reflecting surface 3 and at least as wide as the screen 11 of the computer monitor to facilitate viewing of the entire screen by the viewer. The second reflecting surface is smaller than the first reflecting surface so that the reflection of the monitor screen seen therein substantially fills the surface to eliminate distractions. For example, the first reflecting surface can be 9"×10" and the second 6"×9" when used with a 12" monitor screen. The upright members 6 and 7 supporting the reflecting surfaces may be formed from molded plastic, for example. Each upright member is formed with a flange 13 which extends about the entire periphery of the upright member except for a portion at the lower rear corner of the upright members where there is no flange. The absence of a flange 13 at the lower rear corners of the upright members permits the flanged edges of the upright members to be slidably received in brackets 14 which are integrally molded with a platform 15. Alternatively, the brackets could be formed separately and mounted on the platform with suitable fasteners. The platform 15 serves as a base for the upright members and is adapted to support the computer monitor 5 during use. A set screw 17 in each bracket 14 is provided for releasably clamping the upright member in the bracket whereby the entire assembly of upright members 6 and 7 and reflecting surfaces 2 an 3 carried thereby can be adjusted vertically with respect to the platform 15 and computer monitor 5 thereon. This facilitates adjustment of the reflecting surfaces with respect to the screen 11 of the monitor for proper viewing of the screen in the second reflecting surface 3. The brackets 14 and platform 15 can also be formed from plastic as by molding. The threaded knobs 10 on the studs 4 of each mirror can also be loosened to pivot and vertically adjust the individual reflecting surfaces with respect to the upright members and an adjacent monitor screen, as necessary.

Figure 6:
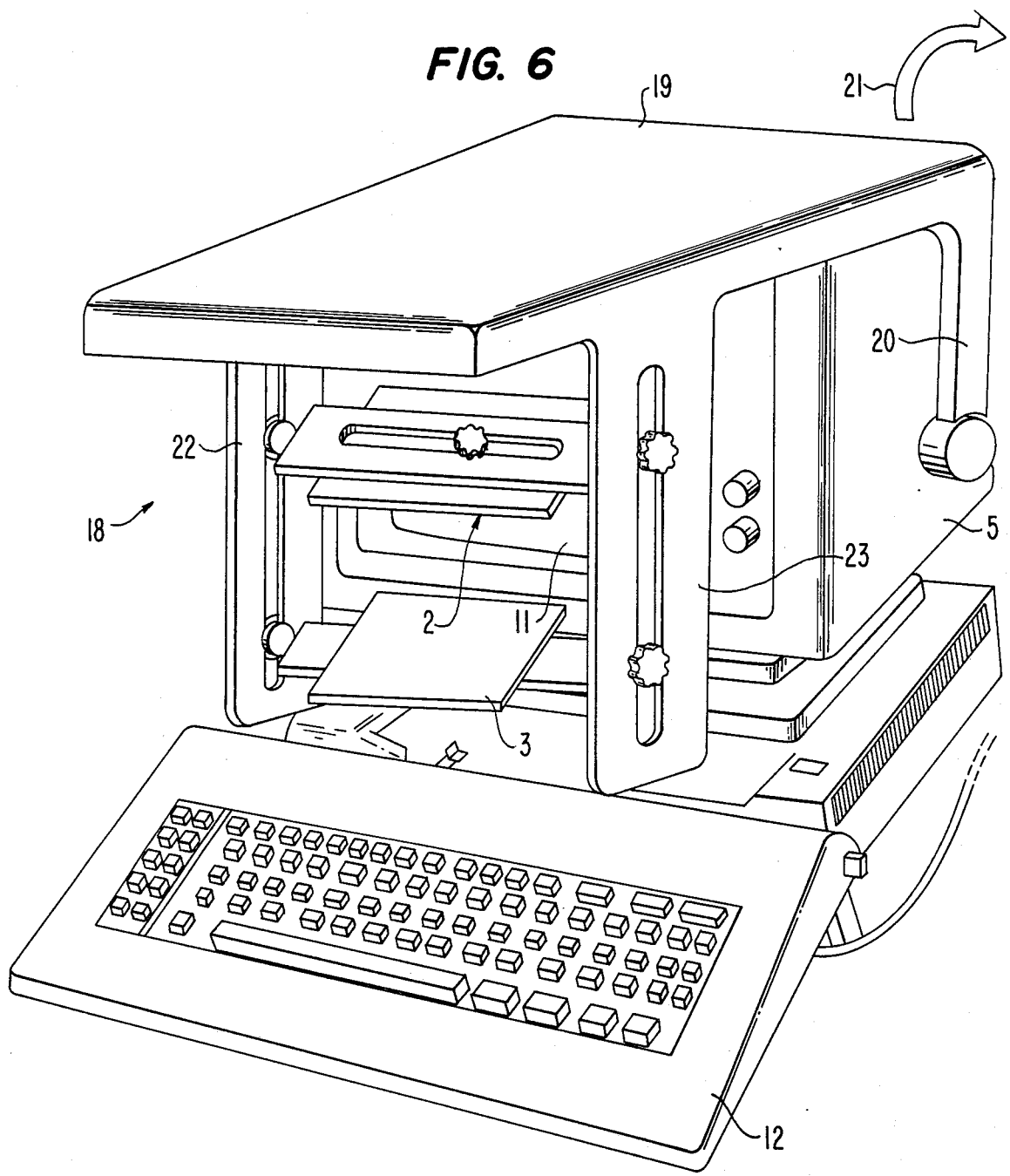
FIG. 6 is a perspective view of another embodiment of the invention wherein the vision saver is pivotally mounted on the computer monitor rather than being free standing as in the embodiment of FIGS. 1-5.

While the vision saver 1 illustrated in FIGS. 1-5 is free standing, according to a second embodiment of the invention illustrated in FIG. 6 of the drawings, the vision saver 18 is connected to and supported on the computer monitor 5 by way of a cover member 19 and a pair of downwardly depending arms 20 at the rear thereof. The lower ends of the arms 20 are each pivotably connected to the sides of the computer monitor with a suitable fastener to allow the vision saver 18 to be pivoted from the position of use shown in FIG. 6 upwardly as shown by the arrow 21 and out from in front of the screen 11 of the monitor. The upright members 22 and 23 of the vision saver 18 are formed integrally at the upper end thereof with the cover member 19 and arms 20. The cover members and upright members prevent light from coming into the vicinity of the monitor screen and distracting the viewer. An opaque cloth could be used to cover the juncture between the upper mirror and the monitor in the embodiment of FIGS. 1-5 for the same purpose, if necessary.

While we have shown and described only two embodiments in accordance with the present invention, it is understood that the same is not limited thereto, but is susceptible to numerous changes and modifications as known to those skilled in the art. Therefore, we do not wish to be limited to the details shown and described herein but intend to cover all such changes and modifications as are encompassed by the scope of the appended claims.

We claim:

1. A vision saver for use with a computer monitor comprising first and second reflecting surfaces and support means for supporting said first and second reflecting surfaces in spaced relation in front of the computer monitor such that said first reflecting surface faces the screen of said monitor and the second reflecting surface, and said second reflecting surface faces said first reflecting surface and outwardly from the screen of said monitor whereby a person can visually observe the screen of the computer monitor by viewing the second reflecting surface, wherein said support means is free standing and includes a platform for supporting the computer monitor, and wherein said support means includes means for adjusting the positions of said first and second reflecting surfaces with respect to said support means.

2. The vision saver according to claim 1, wherein said support means supports said first reflecting surface in an elevated position with respect to said second reflecting surface.

3. The vision saver according to claim 1, wherein said first and second reflecting surfaces are mirrored surfaces.

4. The vision saver according to claim 1, wherein said first and second reflecting surfaces are primary reflecting surfaces.

5. The vision saver according to claim 1, wherein said support means includes means for adjusting the facing directions of said first and second reflecting surfaces.

6. The vision saver according to claim 1, wherein said support means and an edge of said first reflecting surface supported thereby are located in essentially the same plane for positioning immediately adjacent the front of the monitor to prevent any direct view of the monitor.

7. The vision saver according to claim 1, further comprising cover means for covering the juncture between the monitor and the first reflecting surface to prevent extraneous light from distracting a person viewing the monitor screen in the second reflecting surface.

8. The vision saver according to claim 1, wherein said second reflecting surface is smaller than said first reflecting surfaces so that the monitor screen seen in the second reflecting surface substantially fills the second reflecting surface to eliminate disturbances from the field of view.

9. The vision saver according to claim 1, wherein the first reflecting surface has a width which is at least equal to the width of said monitor screen.

10. The vision saver according to claim 1, in combination with a computer monitor which is supported on the platform of said support means.

11. The vision saver according to claim 1, wherein means are provided for adjusting the height of said platform with respect to the remainder of said support means and the first and second reflecting surfaces supported thereby.

12. The vision saver according to claim 11, wherein the remainder of said support means includes a pair of uprights spaced from one another and supporting said first and second reflecting surfaces therebetween at respective ends of said reflecting surfaces.

13. The vision saver according to claim 1, wherein said support means supports said first reflecting surface above said second reflecting surface with the side of said first reflecting surface to be located away from the computer monitor overlapping the corresponding side of the second reflecting surface located beneath it.

14. A vision saver for use with a computer monitor comprising first and second reflecting surfaces and support means for supporting said first and second reflecting surfaces in spaced relation in front of the computer monitor such that said first reflecting surface faces the screen of said monitor and the second reflecting surface, and said second reflecting surface faces said first reflecting surface and outwardly from the screen of said monitor whereby a person can visually observe the screen of the computer monitor by viewing the second reflecting surface, wherein said support means includes means for pivotally connecting said support means to a computer monitor and cover means formed integrally with said support means for covering the juncture between the monitor and the first reflecting surface to prevent extraneous light from distracting a person viewing the monitor screen in the second reflecting surface.

* * * * *